United States Patent

Rogers

[11] Patent Number: 5,746,472
[45] Date of Patent: May 5, 1998

[54] WIND DEFLECTING COVER FOR A CONVERTIBLE VEHICLE

[76] Inventor: Arthur A. Rogers, 5310 E. Suncrest Rd., Anaheim, Calif. 92807

[21] Appl. No.: 730,000

[22] Filed: Oct. 11, 1996

[51] Int. Cl.⁶ .................................................. B62D 35/00
[52] U.S. Cl. .................. 296/180.1; 296/136; 297/220; 224/275
[58] Field of Search ..................... 296/180.1, 180.5, 296/136, 85, 24.1; 297/220; 224/275

[56] References Cited

U.S. PATENT DOCUMENTS

| 2,223,532 | 12/1940 | Sallop | 224/275 |
| 4,850,637 | 7/1989 | Carlino | 296/180.1 |
| 5,044,321 | 9/1991 | Selph | 224/275 X |

FOREIGN PATENT DOCUMENTS

| 4018862 | 1/1992 | Germany | 296/85 |
| 4100731 | 4/1992 | Japan | 296/85 |
| 4003342 | 2/1994 | WIPO | 296/180.1 |

*Primary Examiner*—Dennis H. Pedder

[57] ABSTRACT

A wind deflecting cover for use with a convertible vehicle with a front seat area and a rear seat area. Further provided is a vinyl canvas situated about the rear seat area and depending therein for directing in an upward direction a draft normally directed to the front seat area. As such, a standard oncoming head wind may direct it rearward away from the front seat area.

1 Claim, 2 Drawing Sheets

WIND DEFLECTING COVER FOR A CONVERTIBLE VEHICLE

BACKGROUND OF THE INVENTION

1. Field of the Invention

The present invention relates to a wind deflecting cover and more particularly pertains to deflecting unwanted air flow normally directed to a front seat area of a convertible.

2. Description of the Prior Art

The use of convertible tops is known in the prior art. More specifically, convertible tops heretofore devised and utilized for the purpose of precluding air flow from entering a convertible vehicle are known to consist basically of familiar, expected and obvious structural configurations, notwithstanding the myriad of designs encompassed by the crowded prior art which have been developed for the fulfillment of countless objectives and requirements.

By way of example, the prior art incudes U.S. Pat. Nos. 5,211,718 to Gotz et al.; 5,253,916 to Moore et al.; 4,838,604 to Kochi; 5,443,296 to Just et al.; 5,338,089 to Gotz et al.; and 5,368,356 to Gotz et al.

In this respect, the wind deflecting cover according to the present invention substantially departs from the conventional concepts and designs of the prior art, and in so doing provides an apparatus primarily developed for the purpose of deflecting unwanted air flow normally directed to a front seat area of a convertible.

Therefore, it can be appreciated that there exists a continuing need for a new and improved wind deflecting cover which can be used for deflecting unwanted air flow normally directed to a front seat area of a convertible. In this regard, the present invention substantially fulfills this need.

SUMMARY OF THE INVENTION

In view of the foregoing disadvantages inherent in the known types of convertible tops now present in the prior art, the present invention provides an improved wind deflecting cover. As such, the general purpose of the present invention, which will be described subsequently in greater detail, is to provide a new and improved wind deflecting cover which has all the advantages of the prior art and none of the disadvantages.

To attain this, the present invention essentially comprises a convertible vehicle with a front seat area and a rear seat area. As shown in FIG. 1, the front seat area has a pair of seats with a space situated therebetween. Each seat has a bottom horizontally oriented portion, an intermediate vertically oriented portion, and a head rest situated on a top extent of the intermediate portion. The rear seat area has a rear periphery with a pile faster along the length thereof and a pair of side peripheries each with a pile fastener adhered thereto. The exterior of the car defines the rear and side peripheries of the rear seat area. Further defining the rear seat area is a front periphery determined by a rear extent of the seats. The rear seat area has a first predetermined length between the front periphery and the rear periphery. As best shown in FIG. 1, a pair of head rest covers are provided. Each cover includes a closed top face and a periphery integrally formed therewith and depending therefrom. By this structure, an open bottom is provided for releasably receiving the head rests. Formed on a side of each head rest cover is a head rest extension portion constructed from a resilient material. Each head rest extension portion extends from a top extent of the associated head rest downwardly half the height of the intermediate portion of the associated seat on an outboard side thereof. For reasons that will become apparent later, the head rest covers each further have a strip of pile fasteners along the periphery thereof covering a rear face of the associated head rest. With reference now to FIG. 3, a vinyl canvas with a generally square configuration is included having a front edge, a rear edge, and a pair of side edges defining a periphery. A length between the front edge and the rear edge is about twice the first predetermined length. The front edge has a length equal to that of the front periphery of the rear seat area. For releasably coupling with the pile fasteners of the head rest covers, a pair of pile fasteners are situated along the front edge. The rear edge has a length equal to the rear periphery of the rear seat area with a pile fastener formed along the length thereof for releasably coupling with that of the rear periphery of the rear seat portion. The side edges each also have a pile fastener for releasably coupling with the pile fastener of the side peripheries. Associated therewith are a plurality of button snaps for releasably coupling with button snaps also situated about the side peripheries of the rear seat area. In use, upon the securement of the pile fasteners and button snaps of the canvas, the canvas depends within the rear seat forming a plurality of extents. Such include a rear extent sloping slightly downward from the rear edge forward, an intermediate extent sloping sharply downward from the rear extent forward, and a front extent sloping sharply upward between the intermediate extent and the head rest covers for directing a draft normally directed to the front seat area instead in a vertical direction where a standard oncoming head wind may direct it rearward away from the front seat area.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wind deflecting cover which has all the advantages of the prior art convertible tops and none of the disadvantages.

It is another object of the present invention to provide a new and improved wind deflecting cover which may be easily and efficiently manufactured and marketed.

It is a further object of the present invention to provide a new and improved wind deflecting cover which is of a durable and reliable construction.

An even further object of the present invention is to provide a new and improved wind deflecting cover which is susceptible of a low cost of manufacture with regard to both materials and labor, and which accordingly is then susceptible of low prices of sale to the consuming public, thereby making such wind deflecting cover economically available to the buying public.

Still yet another object of the present invention is to provide a new and improved wind deflecting cover which provides in the apparatuses and methods of the prior art some of the advantages thereof, while simultaneously overcoming some of the disadvantages normally associated therewith.

Still another object of the present invention is to deflect unwanted air flow normally directed to a front seat area of a convertible.

Lastly, it is an object of the present invention to provide a new and improved wind deflecting cover for use with a convertible vehicle with a front seat area and a rear seat area. Further provided is a vinyl canvas situated about the rear seat area and depending therein for directing in an upward direction a draft normally directed to the front seat area. As such, a standard oncoming head wind may direct it rearward away from the front seat area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
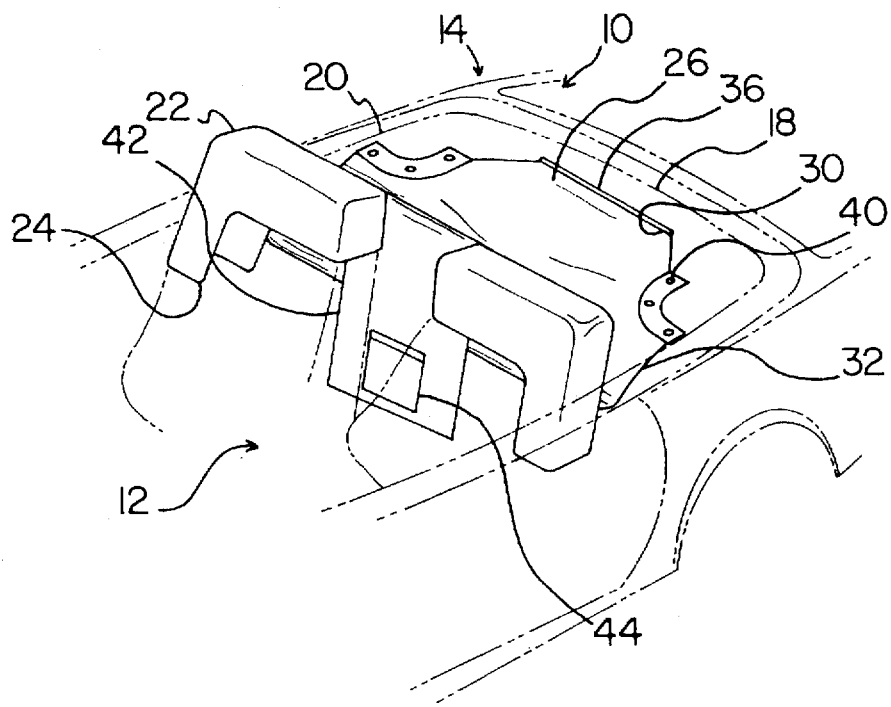
FIG. 1 is a perspective illustration of the preferred embodiment of the wind deflecting cover constructed in accordance with the principles of the present invention.
Figure 2:
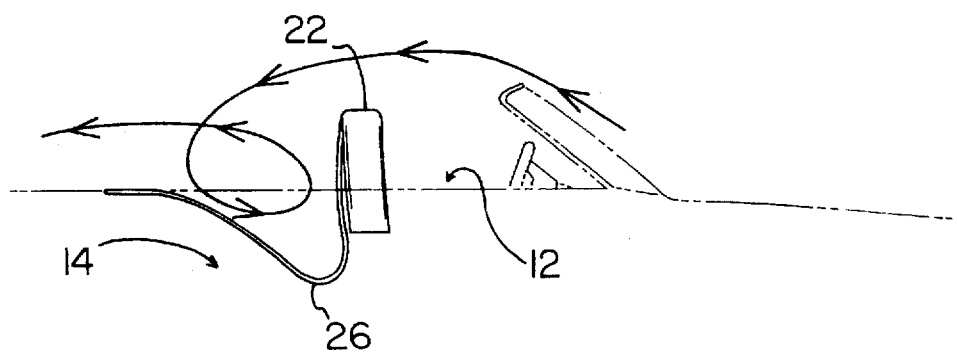
FIG. 2 is a side elevational view of the present invention in use.

With reference now to the drawings, and in particular to FIG. 1 thereof, a new and improved wind deflecting cover embodying the principles and concepts of the present invention and generally designated by the reference numeral 10 will be described.

The present invention, the new and improved wind deflecting cover, is comprised of a plurality of components. Such components in their broadest context include a convertible car, a pair of head rest covers, a vinyl canvas, and a front flap. Such components are individually configured and correlated with respect to each other so as to attain the desired objective.

More specifically, it will be noted that the system 10 of the present invention includes a convertible vehicle with a front seat area 12 and a rear seat area 14. As shown in FIG. 1, the front seat area has a pair of seats with a space situated therebetween. Each seat has a bottom horizontally oriented portion, an intermediate vertically oriented portion, and a head rest situated on a top extent of the intermediate portion. The rear seat area has a rear periphery 18 with a pile faster along the length thereof and a pair of side peripheries 20 each with a pile fastener adhered thereto. The exterior of the car defines the rear and side peripheries of the rear seat area. Further defining the rear seat area is a front periphery determined by a rear extent of the seats. The rear seat area has a first predetermined length between the front periphery and the rear periphery.

As best shown in FIG. 1, a pair of head rest covers 22 are provided. Each cover includes a closed top face and a periphery integrally formed therewith and depending therefrom. By this structure, an open bottom is provided for releasably receiving the head rests. Formed on a side of each head rest cover is a head rest extension portion 24 constructed from a resilient material. It should be noted that the headrest extension be wide enough to fit snugly against a door and raised window of the vehicle to cause an airtight seal which thereby precludes the window from rattling. Each head rest extension portion extends from a top extent of the associated head rest downwardly half the height of the intermediate portion of the associated seat on an outboard side thereof. Such structure aids in preventing a draft from entering the front seat area. For reasons that will become apparent later, the head rest covers each further have a strip of pile fasteners 27 along the periphery thereof covering a rear face of the associated head rest.

Figure 3:
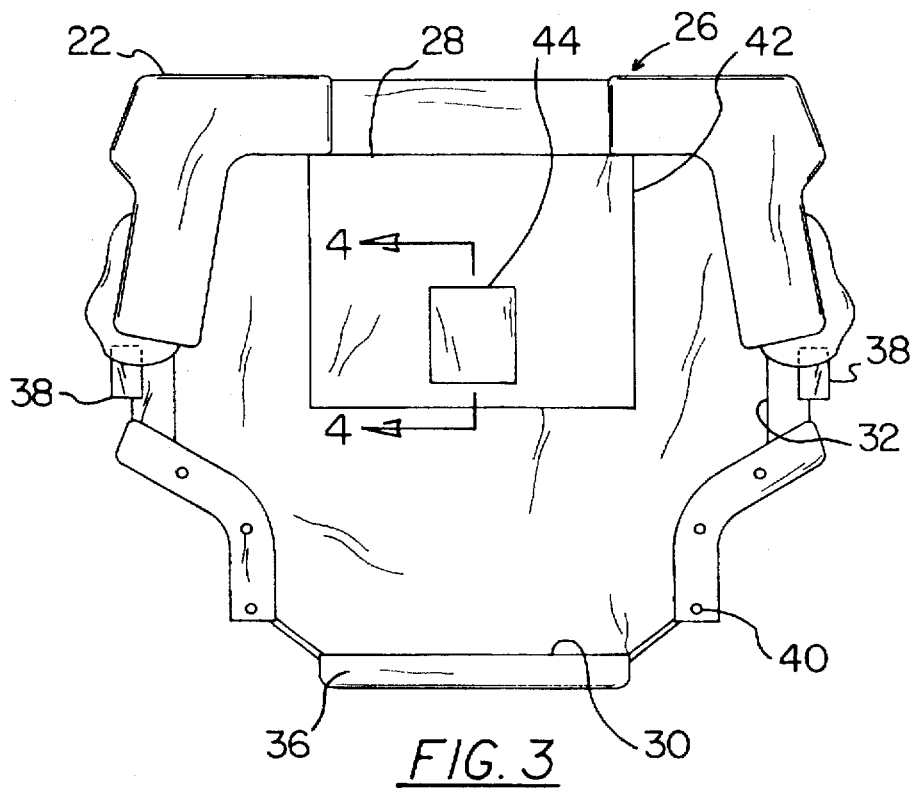
FIG. 3 is a top plan view of the present invention.
Figure 4:
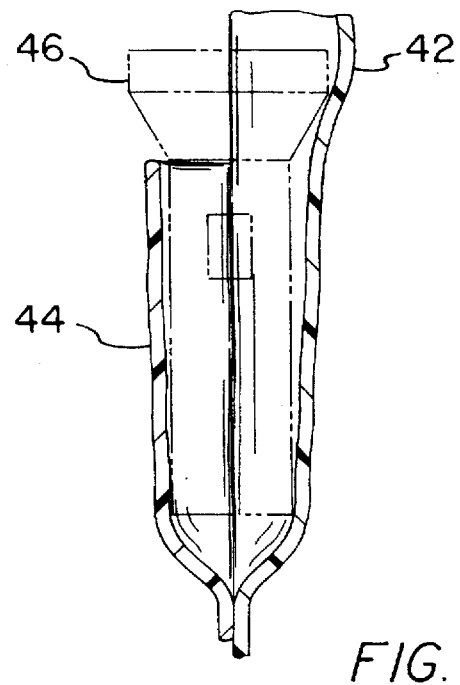
FIG. 4 is a cross-sectional view of the pouch and associated flashlight of the present invention.

With reference now to FIG. 3, a vinyl canvas 26 with a generally square configuration is included having a front edge 28, a rear edge 30, and a pair of side edges 32 defining a periphery. A length between the front edge and the rear edge is about twice the first predetermined length. The front edge has a length equal to that of the front periphery of the rear seat area. For releasably coupling with the pile fasteners of the head rest covers, a pair of pile fasteners are situated along the front edge. The rear edge has a length equal to the rear periphery of the rear seat area with a pile fastener 36 formed thereon along the length thereof for releasably coupling with pile fastener 37 of the rear periphery of the rear seat portion. The side edges each also have a pile fastener 38 for releasably coupling with the pile fastener 39 of the side peripheries. Associated therewith are a plurality of button snaps 40 for releasably coupling with button snaps also situated about the side peripheries of the rear seat area. Such button snaps are reinforced with a reinforcement canvas strip. It should be noted that the form of attachment may vary by model of the vehicle. Sliders, hook and eyelets, etc may be employed in lieu of the button snaps and pile fasteners. As shown in the Figures, the side edges are formed with U-shaped cut outs for conforming to the peripheries of the rear seat area. In use, upon the securement of the pile fasteners and button snaps of the canvas, the canvas depends within the rear seat forming a plurality of extents. Such include a rear extent sloping slightly downward from the rear edge forward, an intermediate extent sloping sharply downward from the rear extent forward, and a front extent sloping sharply upward between the intermediate extent and the head rest covers for directing a draft normally directed to the front seat area instead in a vertical direction where a standard oncoming head wind may direct it rearward away from the front seat area. It should be noted that the canvas properly sags as a result of the downward thrust of the wind in combination with the weight of the canvas.

Further provided is a front flap 42 situated within the space between the seats of the front seat area for further preventing the draft from entering the front seat area and further providing a pouch 44 for supporting a conventional flashlight 46.

To install the pile fasteners to the periphery of the vehicle, an adhesive kit is ideally provided with the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wind deflecting cover comprising, in combination:

a convertible vehicle with a front seat area and a rear seat area, the front seat area having a pair of seats with a space situated therebetween, a bottom horizontally oriented portion, an intermediate vertically oriented portion, and a head rest situated on a top extent of the intermediate portion, the rear seat area having a rear periphery with a pile faster along the length thereof and a pair of side peripheries each with a pile fastener adhered thereto, wherein the rear and side peripheries of the rear seat area are formed of an exterior of the vehicle, the rear seat area further having a front periphery defined by a rear extent of the seats, the rear seat area having a first predetermined length between the front periphery and the rear periphery;

a pair of head rest covers each including a closed top face and a periphery integrally formed therewith and depending therefrom thus defining an open bottom for releasably receiving the head rests, the head rest covers each further including a head rest extension portion formed on a side of the head rest cover with a resilient material, each head rest extension portion extending from a top extent of the associated head rest and extending downwardly half the height of the intermediate portion of the associated seat on an outboard side thereof for abutting against a door and a raised window of the vehicle to cause an airtight seal which precludes the window from rattling and preventing a draft from entering the front seat area, the head rest covers each further having a strip of pile fasteners along the periphery thereof covering a rear face of the associated head rest;

a vinyl canvas with a front edge, a rear edge, and a pair of side edges defining a periphery with a length between the front edge and the rear edge being about twice the first predetermined length, the front edge having a length equal to that of the front periphery of the rear seat area and a pair of pile fasteners for releasably coupling with the pile fasteners of the head rest covers, the rear edge having a length equal to the rear periphery of the rear seat area with a pile fastener formed thereon along the length thereof for releasably coupling with that of the rear periphery of the rear seat portion, the side edges each having a pile fastener for releasably coupling with the pile fastener of the side peripheries and a plurality of button snaps for releasably coupling with button snaps also situated about the side peripheries of the rear seat area, the side edges of the canvas having U-shaped cut outs formed therein for conforming to the side peripheries of the rear seat area of the vehicle, whereby upon the securement of the pile fasteners and button snaps of the canvas, the canvas depends within the rear seat forming a rear extent sloping slightly downward from the rear edge forward, an intermediate extent sloping sharply downward from the rear extent forward, and a front extent sloping sharply upward between the intermediate extent and the head rest covers for directing a draft normally directed to the front seat area instead in a vertical direction where a standard oncoming head wind may direct it rearward away from the front seat area; and a front flap situated within the space between the seats of the front seat area for further preventing the draft from entering the front seat area and further providing a pouch for supporting a conventional flashlight.

* * * * *